United States Patent [19]

Makishima

[11] Patent Number: 5,424,954

[45] Date of Patent: Jun. 13, 1995

[54] COMPUTER-AIDED GLASS COMPOSITION DESIGN APPARATUS AND METHOD

[75] Inventor: Akio Makishima, Tsukuba, Japan

[73] Assignee: National Institute for Research in Inorganic Materials Science and Technology Agency, Ibaragi, Japan

[21] Appl. No.: 729,416

[22] Filed: Jul. 12, 1991

Related U.S. Application Data

[63] Continuation-in-part of Ser. No. 314,075, Feb. 23, 1989, abandoned.

[30] Foreign Application Priority Data

Oct. 20, 1988 [JP] Japan ................................. 63-26467

[51] Int. Cl.[6] ..................... G05B 19/418; G05B 15/00
[52] U.S. Cl. .................................. 364/473; 364/468; 364/188; 364/474.24
[58] Field of Search ............... 364/473, 188, 146, 468, 364/474.22, 474.24; 65/158, 161, 162, 163, 164

[56] References Cited

U.S. PATENT DOCUMENTS 3,779,731 12/1973 Pollock et al. ................... 364/473
3,938,976 2/1976 Walker .
4,277,274 7/1981 Chrisman .
4,457,772 7/1984 Haynes et al. .
4,805,089 2/1989 Lane et al. .

OTHER PUBLICATIONS

Akio Makishima et al.; "Calculation of Thermal Expansion Coefficient of Glasses"; Journal of Non–Crystalline Solids 22 (1976) 303–313.

Akio Makishima et al.; "Calculation of Bulk Modulus, Shear Modulus and Poisson's Ratio of Glass"; Journal of Non–Crystalline Solids 17 (1975) 147–157.

A. Makishima et al.; "Direct Calculation of Young's Modulus of Glass"; Journal of Non–Crystalline Solds, 12 (1973) 35–45.

Herman H. Frahme; "Computerization Increases Batching Capacity"; Ceramic Industry, Jun., 1990; pp. 44–45.

Primary Examiner—James P. Trammell
Attorney, Agent, or Firm—Wenderoth, Lind & Ponack

[57] ABSTRACT

A computer-aided class composition design apparatus includes a memory device having stored therein glass component compound data and glass physical property data. A display device is used for initially displaying a plurality of glass component compounds from among the glass component compound data. Using an input device, a glass composition is selected from among the displayed glass components. The glass physical property data is processed to approximate at least one physical property of the selected glass composition. Alternately, the glass physical properties themselves are displayed and values assigned thereto, and the component compound data and glass physical property data are processed to obtain a glass composition having approximated physical property values in accordance with the selected physical property values.

13 Claims, 10 Drawing Sheets

| | | | |
|---|---|---|---|
| $Al_2O_3$ | $Y_2O_3$ | $SnO_2$ | $In_2O_3$ |
| $BeO$ | $Ga_2O_3$ | $Ce_2O_3$ | $As_2O_3$ |
| $UO_2$ | $CrO_3$ | $SrO$ | $Fe_3O_4$ |
| $WO_3$ | $La_2O_3$ | $GeO_2$ | $Co_3O_4$ |
| $MoO_2$ | $FeO$ | $Nd_2O_3$ | $K_2O$ |
| $ZrO_2$ | $NiO$ | $Cr_2O_3$ | $Sb_2O_5$ |
| $MoO_3$ | $CaO$ | $ZnO$ | $Mn_3O_4$ |
| $MnO_2$ | $CuO$ | $Fe_2O_3$ | $Sb_2O_3$ |
| $TiO_2$ | $SiO_2$ | $BaO$ | $BiO$ |
| $Sc_2O_3$ | $CoO$ | $PbO_2$ | $Pb_2O$ |
| $MgO$ | $P_2O_5$ | $RuO_2$ | $PbO$ |
| $ThO_2$ | $MnO$ | $Na_2O$ | $Bi_2O_3$ |
| $Li_2O$ | $SeO_2$ | $Mn_2O_3$ | $Cu_2O$ |
| $B_2O_3$ | $Nb_2O_5$ | $CdO$ | $Cs_2O$ |
| $Ta_2O_5$ | $As_2O_5$ | $TeO$ | $Ag_2O$ |

Fig. 4

| | |
|---|---|
| Maximum Young's modulus is 676.101 Kbar. Young's modulus is thought to be low. The respective ratios will be such as in the right table. Please indicate next disposal. | $Al_2O_3$ 1.0<br>$B_2O_3$ 11.0<br>$SiO_2$ 83.0<br>$Na_2O$ 5.0 |

Fig. 5

Maximum Young's modulus is 1006.07Kbar.
Young's modulus is thought to be high.
The respective vaues of physical properties will be such as in the right table.
Please indicate next disposal.

| | |
|---|---|
| Bulk modulus | 663.419 |
| Shear modulus | 430.514 |
| Poisson's ratio | 2.48057F-01 |
| Density | 2.73743 |
| Inelasticity | 367.524 |
| Degree of atomic pack | 5.51272F-01 |
| Thermal expansion coefficient | 45.826 |
| Index of refraction | 1.5904 |
| Mean despersion modulus | 1062.34 |
| Dielectric constant | 11.3123 |
| Price (¥) | 1.51923 |
| Price ($) | 1.26644F-02 |

| Please select values of physical properties from in the right table through operation of a mouse, and enter their respective conditions and values in turn. | Young's modulus >1000 |
| | Bulk modulus |
| | Shear modulus |
| | Poisson's ratio |
| | Inelasticity |
| | Degree of pack |
| | Density <5 |
| | Thermal expansion <30 coefficient |
| | Index of refraction |
| | Mean despersion modulus |
| | Dielectric constant |
| | Price |

ENTER

Fig. 9

| Please select oxides through operation of a mouse and enter the respective molecular ratios. | $SiO_2$ 60 |
| | $Al_2O_3$ |
| | $ZrO_2$ |

ENTER

Fig. 8

In case of the following respective molecular ratios.

SiO2  50.1
Al2O3  39.9
ZrO2  10.0

The respective physical properties will be such as in the right table.
Please indicate next disposal.

| | | |
|---|---|---|
| Young's modulus | 1013.42 | Kbar |
| Bulk modulus | 644.412 | Kbar |
| Shear modulus | 437.158 | Kbar |
| Poisson's ratio | 2.38732F-01 | |
| Density | 2.58867 | g/cm³ |
| Inelasticity | 391.482 | Kbar/g/cm³ |
| Degree of atomic pack | 5.31596F-01 | |
| Thermal expansion coefficient | -9.444 | 10F-7/°C |
| Index of refraction | 1.56145 | Nd |
| Mean despersion modulus | 902.325 | 1/ν |
| Dielectric constant | unable to calculate | |
| Price | 1.55166 | yen |

Fig. 10

In case of the following respective molecular ratios,
SiO2    60.0
Al2O3   35.0
ZrO2    5.0
The respective values of physical properties will be such as in the right table. Please indicate next disposal.

| | | |
|---|---|---|
| Young's modulus | 949.064 | Kbar |
| Bulk modulus | 596.657 | Kbar |
| Shear modulus | 410.462 | Kbar |
| Poisson's ratio | 0.23574 | |
| Density | 2.45927 | g/cm³ |
| Inelasticity | 385.913 | Kbar/g/cm³ |
| Degree of atomic pack | 5.25576E-01 | |
| Thermal expansion coefficient | -2.65 | 10F-7/°C |
| Index of refraction | 1.5222 | Nd |
| Mean despersion modulus | 815.0 | 1/ν |
| Dielectric constant unable to calculate | | |

FIG. 12

COMPUTER-AIDED GLASS COMPOSITION DESIGN APPARATUS AND METHOD

CROSS REFERENCE TO RELATED APPLICATION

This application is a continuation-in-part of application Ser. No. 07/314,075, which was filed on Feb. 23, 1989 and which is now abandoned.

INVENTOR

Akio MAKISHIMA

BACKGROUND OF THE INVENTION

1. Field of the Invention

The present invention relates to an apparatus and method in support of glass design. More particularly, the present invention relates to a computer aided glass composition design apparatus used in the selection and design of a composite of vitrifying multielement composite oxides and various physical property values of glass materials.

2. Description of the Prior Art

Materials known as "new glass" having properties which are different from those of conventional glass materials are now attracting widespread attention, and various types of glass materials falling into the "new glass" category have been developed. As typically represented by glass materials used for optical fibers, these materials now play an important role in supporting the present information age. As with other ceramic materials, glass materials having utilities which are quite different from those of the conventional glass materials are being studied for use in optoelectronic, electrical and electronic, and biological and biochemical fields.

However, since these new glass materials are composite compositions comprising many compounds, particularly many oxides, it is not easy to achieve desired physical properties by precisely controlling their composition.

It is therefore necessary to accumulate experimental findings through innumerable trials and utilize such findings in the development of the new glass materials. The selection of raw material compositions and component ratios thus entails substantial time and labor.

It has therefore been very difficult to practically achieve a glass composition having desired prescribed physical properties.

SUMMARY OF THE INVENTION

An object of the present invention is therefore to provide an apparatus for support of glass design, which overcomes the conventional problems of substantial time and labor consumption and which facilitates the design of a glass material having a desired composition or utility, permitting efficient selection of a composition of vitrifying multielement composite oxides and selection of physical properties.

This and other objects of the present invention will be readily understood from the following detailed description with reference to the drawings illustrating embodiments of the present invention.

DETAILED DESCRIPTION OF THE EMBODIMENTS

The embodiments of the present invention are described below with reference to the drawings.

Figure 1:
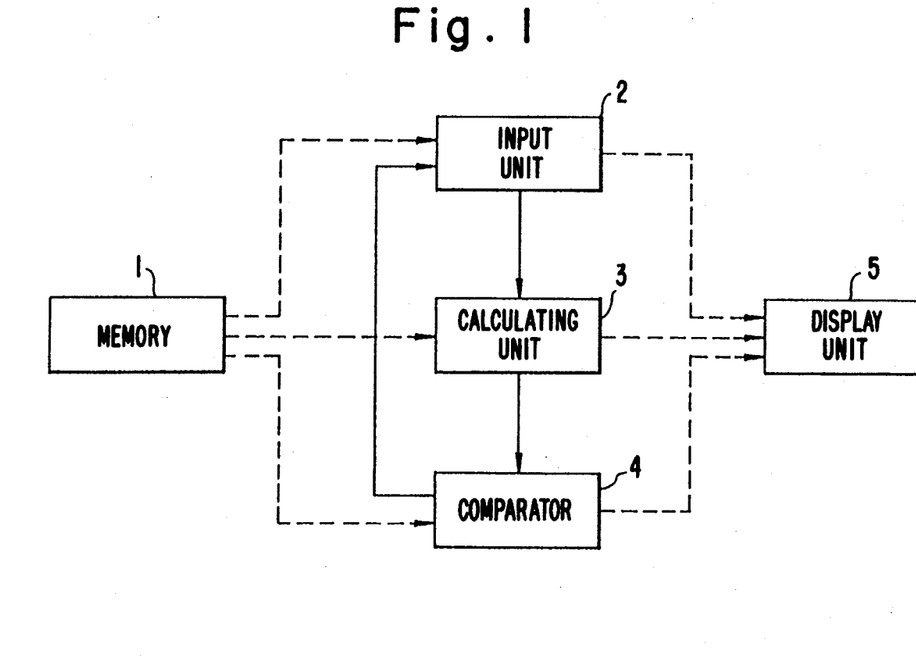
FIG. 1 is a block diagram illustrating a configuration of the present invention.

FIG. 1 is a block diagram illustrating a configuration of the computer-aided glass composition design apparatus of the present invention. As shown in FIG. 1, the apparatus includes a memory unit (1) such as a RAM or ROM, an input unit (2) such as a keyboard or a mouse, a calculating unit (3) and a comparator (4) such as a processor, and a display unit (5) such as a CRT. The memory unit (1) has stored therein a list of glass component compounds, glass compositions and glass physical properties. Data information from this list is directed to the input unit (2), the calculating unit (3) and the comparator (4).

The display unit (5) may be of the interactive type and may be provided with input functions.

The operation of the computer-aided glass composition design apparatus of the above configuration is described below with further reference to FIGS. 2-5.

Figure 3:
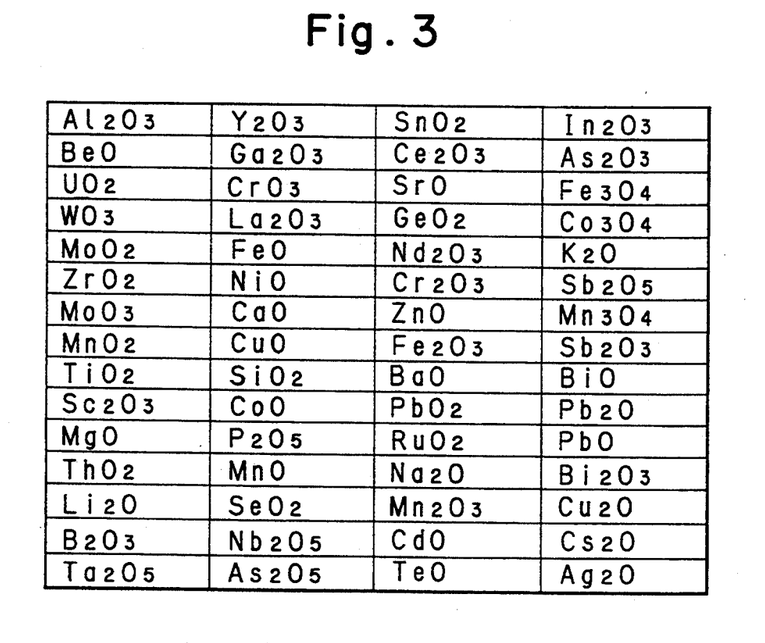
FIGS. 3, 4 and 5 are views illustrating examples of a display in accordance with the flow chart shown in FIG. 2.

A desired composition (including component ratios) is selected from the list of component compounds displayed on the display unit (5), and the selected composition is entered via the input unit (2). For example, as shown in FIG. 3, in the case of oxides as component compounds, a desired composition of oxides is selected from the displayed list and entered by operation of the input unit (2), for example using a mouse.

After the completion of this initial input process, values of physical properties corresponding to the selected composition are calculated by the calculating unit (3). In the preferred embodiment, the value of only a single representative or particularly important physical property is first calculated. Then, after determining the appropriateness of the value of this single property, using the comparator (4) as described below, other physical property values may be calculated.

Figure 2:
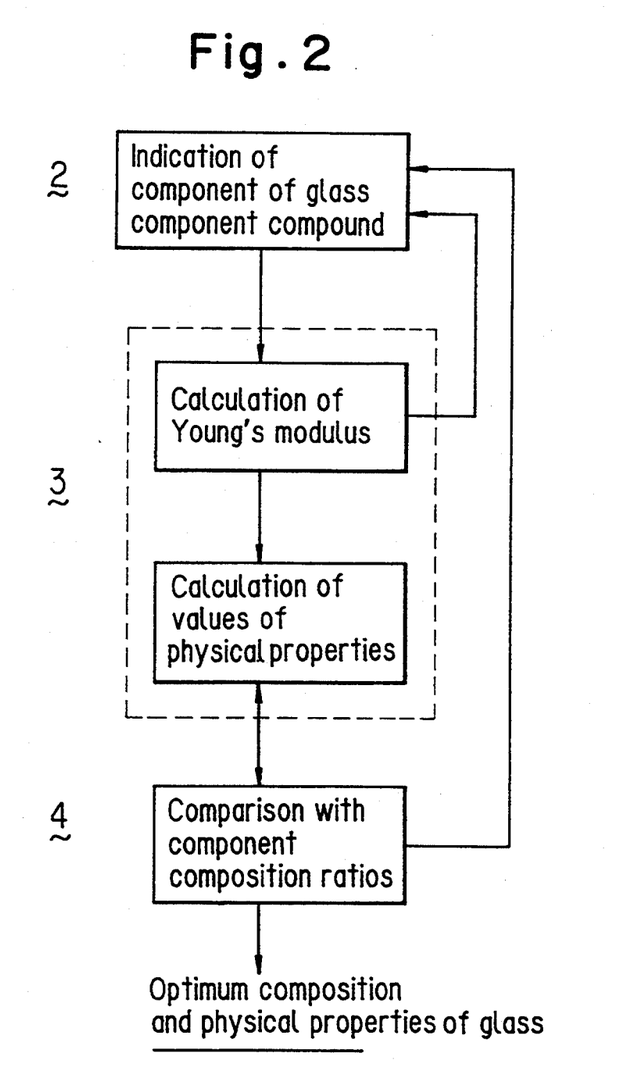
FIG. 2 is a system flow chart of an embodiment of the apparatus of the present invention.
Figure 4:
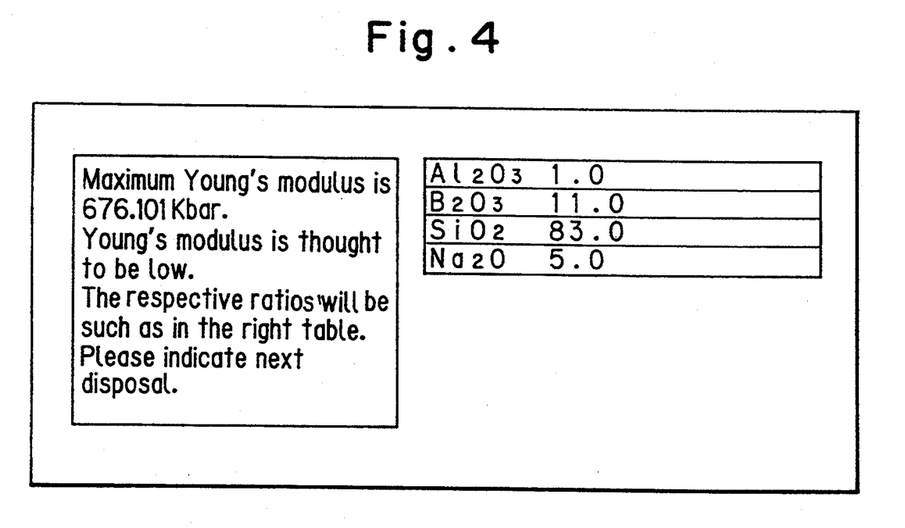

In the example shown in FIG. 2, Young's modulus is adopted as the representative or particularly important physical property value. Young's modulus is calculated from the selected combination of oxides. Young's modulus is adopted here because particular attention is given to the glass modulus of elasticity. The composition ratio and the calculated Young's modulus is displayed as shown in FIG. 4.

Young's modulus in this example is calculated as 676.101 kbar, which is judged to be rather low as a glass property. The comparator (4) compares the calculated value of Young's modulus with a prestored value range of Young's modulus. The prestored value range may, for example, denote values in which vitrification of the entered composition is feasible. If the calculated Young's modulus falls outside the prestored value range, the comparator (4) prompts the display (5) to so indicate, for example, as shown in FIG. 4. When the value of Young's modulus is too low or too high, a corrected composition is entered again via the input unit (2).

When appropriate, calculation is further performed for the other physical properties as discussed above. That is, for example, when comparator (4) determines that the calculated Young's modulus value falls within the prestored range, the other physical properties of the entered composition may be calculated and displayed.

Figure 5:
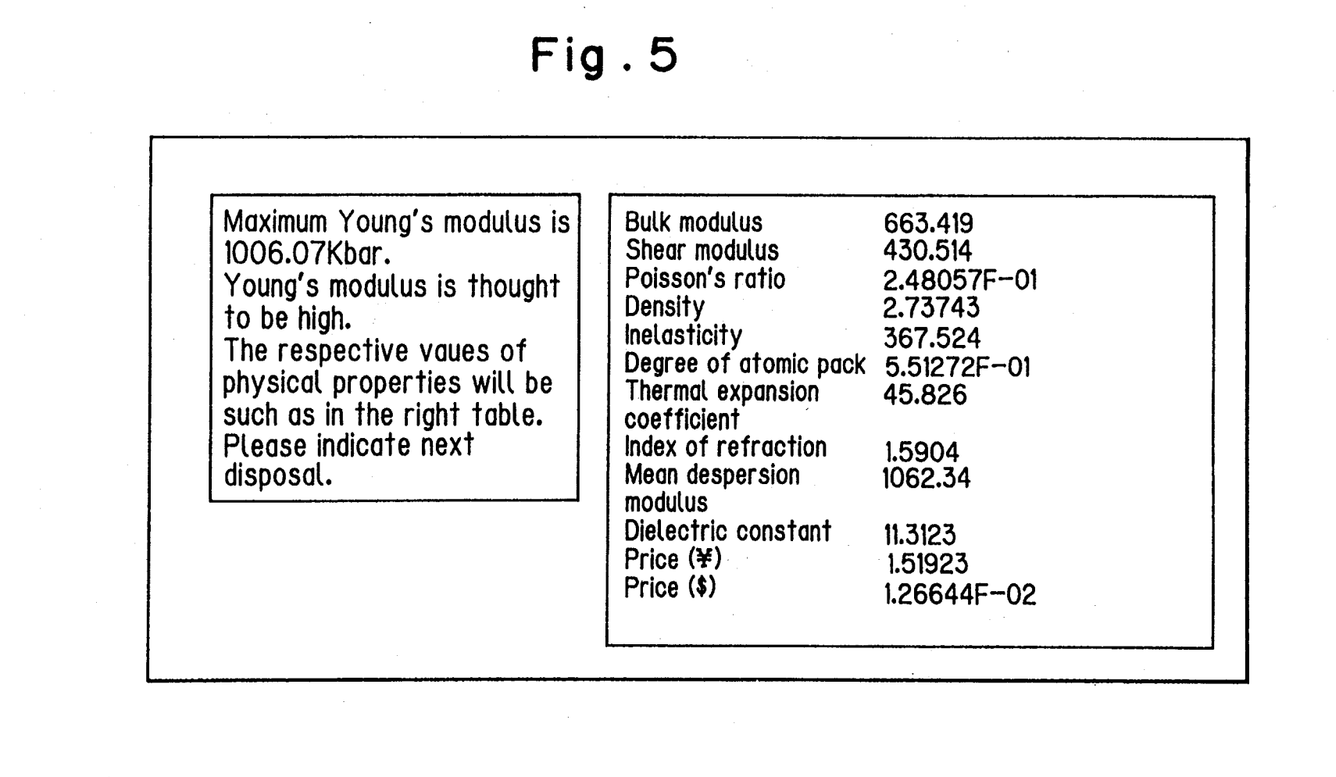

FIG. 5 shows a typical display of calculated values of other physical properties. When these calculated values of physical properties are different from those desired of the target glass material, another glass composition may be entered for the purpose of obtaining the desired physical properties while comparing such with the various component compounds.

A physical property (P) of glass, such as Young's modulus, can be expressed generally by the following formula:

$$P = \Sigma P_i X_i$$

where,
Pi: coefficient for the property of component compound i,
Xi: molar fraction for component compound i.

As Pi is an empirical value, the value of glass physical property (P) is of course an approximate value.

Figure 6:
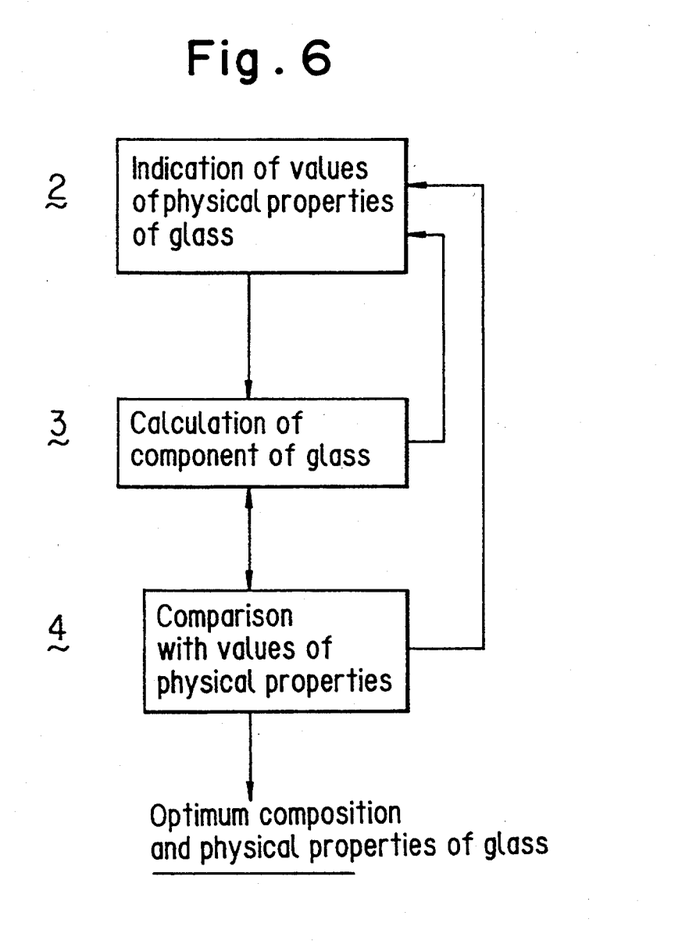
FIG. 6 is a system flow chart of another embodiment of the present invention.

FIG. 6 depicts another embodiment of the computer-aided glass composition design apparatus of the present invention.

Figure 7:
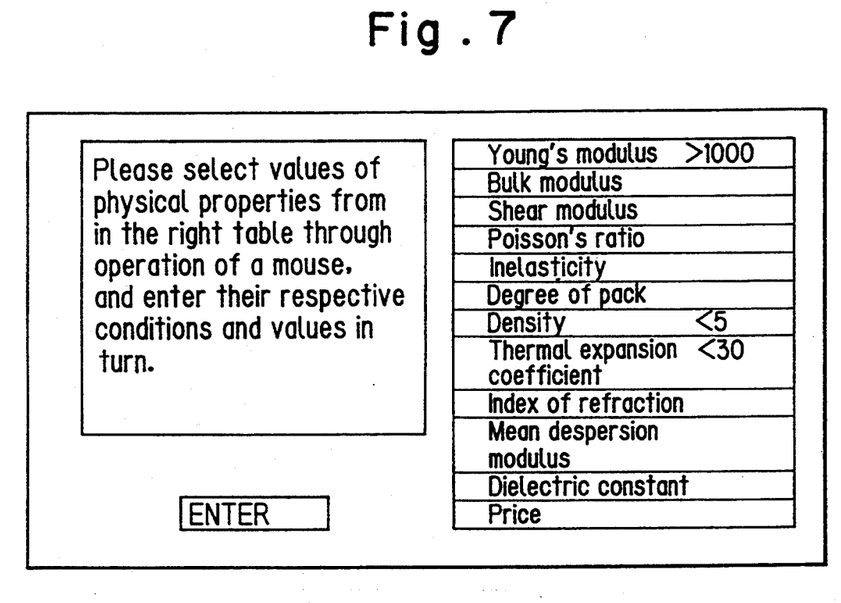
FIGS. 7, 8, 9 and 10 are views illustrating examples of a display in accordance with the flow chart shown in FIG. 6.

In this embodiment, as shown in FIG. 6, an appropriate composition is derived based on entered values of glass physical properties. More specifically, desired values of physical properties are entered using the display (5) as shown in FIG. 7. In this example, a Young's modulus > 1000, a density < 5, and a thermal expansion coefficient < 30 kare entered.

Figure 8:
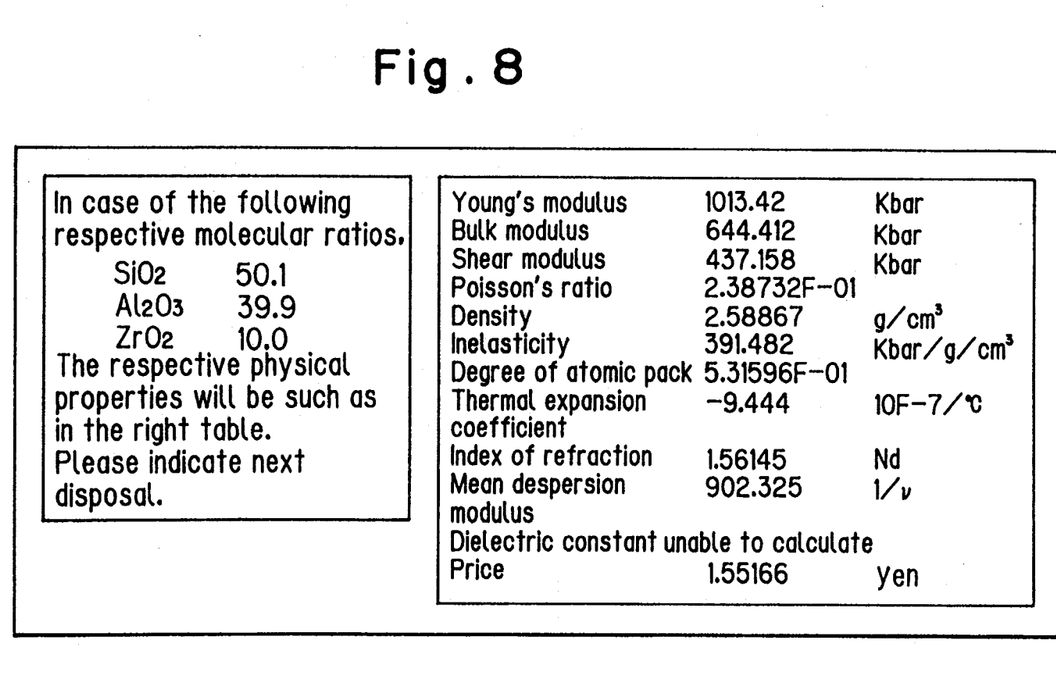

Compositions are determined by the calculating unit (4) which satisfy all the conditions of the entered physical property values or which satisfy only some of these conditions. For example, a composition comprising the following molar ratio values may be calculated and displayed as shown in FIG. 8:

| | |
|---|---|
| $SiO_2$ | 50.1 |
| $Al_2O_3$ | 39.9 |
| $ZrO_2$ | 10.0 |

Values of the other physical properties are then also displayed.

Figure 9:
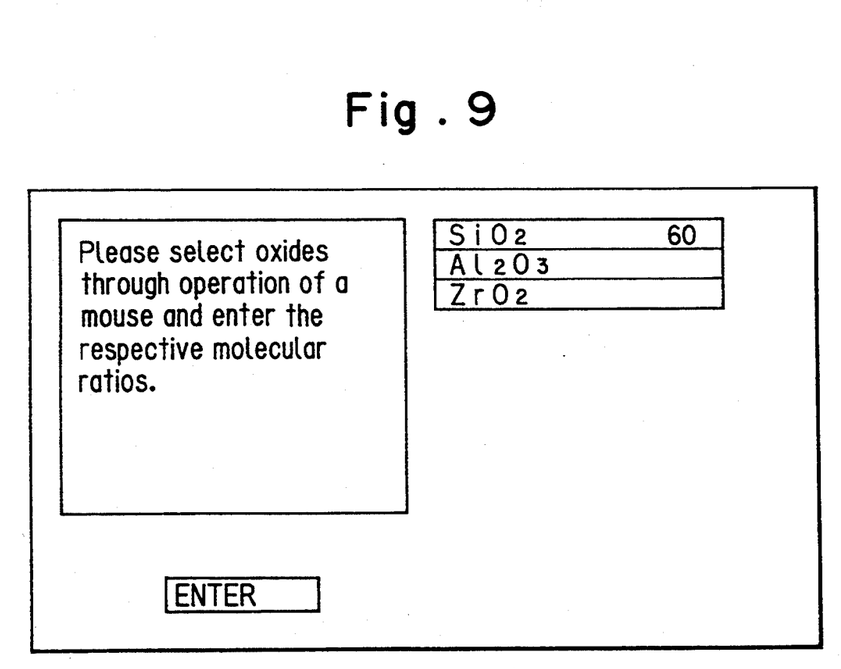
Figure 10:
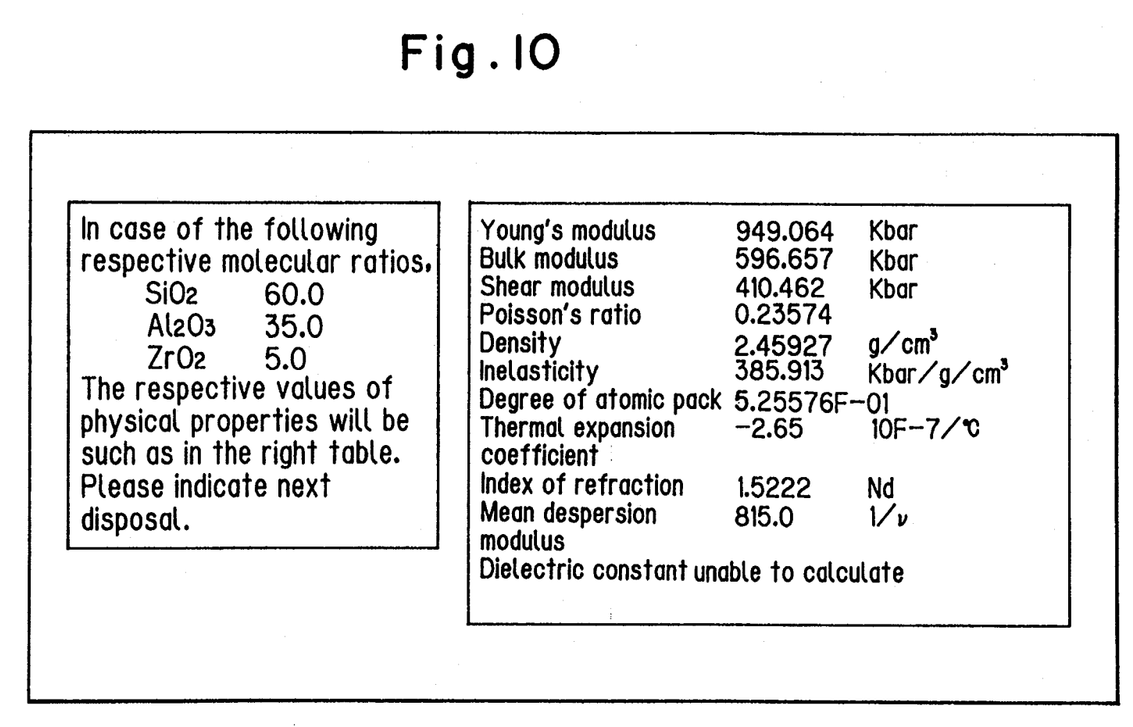

By comparing the composition and the values of the physical properties, the molar ratio of:

| | |
|---|---|
| $SiO_2$ | 60 | may be entered again as a value similar to that displayed as above as shown in FIG. 9. As a result, a correspondence between the new composition and the physical properties is calculated and displayed as shown in FIG. 10.

Of course, when calculation or comparison of a composition and physical property values is not possible in the case presented above, a display to that effect appears on the display unit (5) to urge re-entry.

To confirm a sufficient correlation between the calculated property values and actual property values, and to demonstrate the utility of the present invention, various tests were conducted which are described below as Example 1 and Example 2.

(1) Example 1

Figure 11:
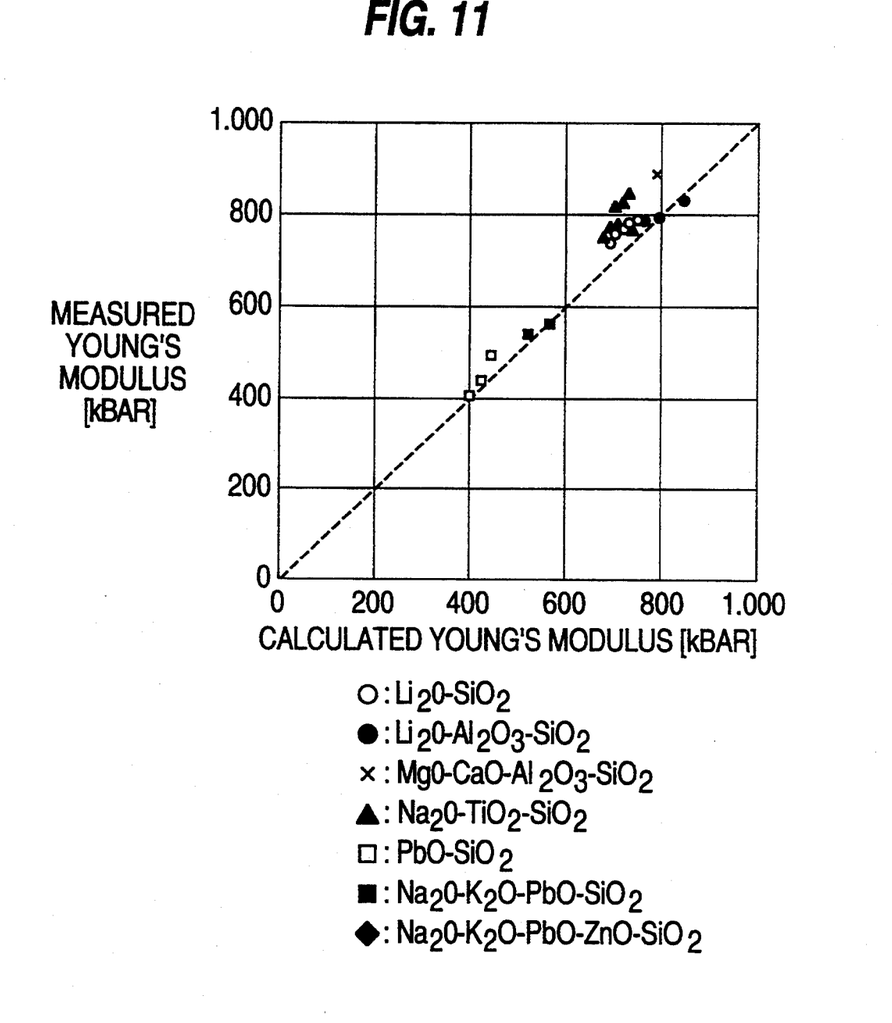
FIGS. 11 and 12 are graphs depicting calculated and measured properties of example glass materials manufactured in accordance with the present invention.

Comparisons were conducted between calculated Young's Modulus values and measured Young's Modulus values for the seven glass compositions $Li_2O$-$SiO_2$, $Li_2O$-$Al_2O_3$-$SiO_2$, $MgO$-$CaO$-$Al_2O_3$-$SiO_2$, $Na_2O$-$TiO_2$-$SiO_2$, $PbO$-$SiO_2$, $Na_2O$-$K_2O$-$PbO$-$Si_2O$, $Na_2O$-$K_2O$-$PbO$-$ZnO$-$SiO_2$. FIG. 11 depicts the compared results. As is clear from FIG. 11, the calculated data correspond closely to actual measured data.

(2) Example 2

In yttria-aluminosilicate glass as a frame of $Y_2O_3$-$Al_2O_3$-$SiO_2$, a new glass material having thermal expansion coefficient equal to about $100 \times 10^{-7}$ was designed. New compositions samples 1 and 2 were calculated.

| | |
|---|---|
| (sample 1) | |
| $Na_2O$ | 15.0 |
| $Al_2O_3$ | 7.6 |
| $Y_2O_3$ | 5.4 |
| $SiO_2$ | 69.0 |
| $ZrO_2$ | 3.0 |
| (sample 2) | |
| $Na_2O$ | 17.0 |
| $Al_2O_3$ | 7.6 |
| $Y_2O_3$ | 5.4 |
| $SiO_2$ | 70.0 |

Then, glass materials having compositions of samples 1 and 2 were actually synthesized in the following process.

$Y_2O_3$, $Al_2O_3$, $Na_2O$, $ZrO_2$, and acid-washed silica sand, or $Y_2O_3$, $Al_2O_3$, $Na_2O$, and acid-washed silica sand were weighed and mixed. 50 g batches were melted in high-alumina crucibles for 3 h up to 1550° C. in an electric furnace with SiC heating elements. After 3 mm-diameter rods were drawn from the melt, the rods were annealed at about 30° C. above Tg (glass transition temperature) and cooled to room temperature.

Figure 12:
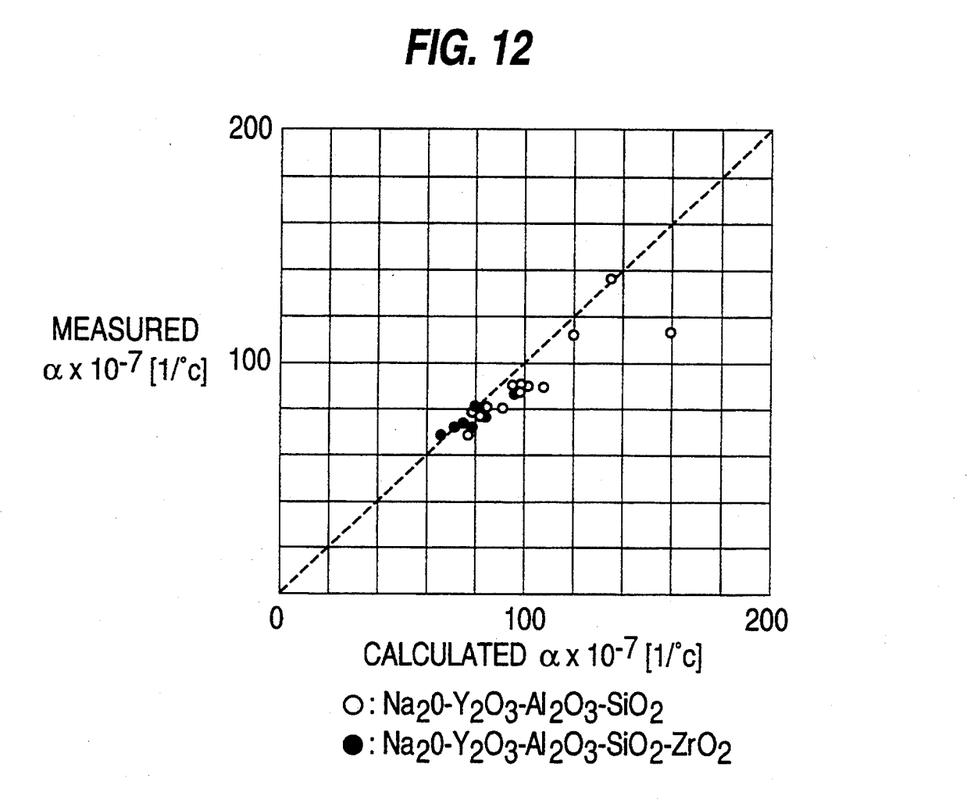

The thermal expansion coefficient was measured for each manufactured glass and was compared with the calculated thermal expansion coefficient. FIG. 12 depicts the compared results. As is clear from FIG. 12, it is confirmed that the calculated thermal expansion coefficient corresponds closely to the actual measured thermal expansion coefficient.

Further, acid durability, alkaline durability, density, and microhardness of the manufactured glass materials having compositions of samples 1 and 2 were measured. For comparison purposes, properties of the commercial coating glass $Li_2O$-$Na_2O$-$K_2O$-$CaO$-$BaO$-$B_2O_3$-$ZrO_2$-$SiO_2$ were measured. Each test was performed as follows.

The glass rod samples were cut and their sharp edges were polished in order to avoid microcracking on the edges. After the dimensions of the rod were measured with a micrometer, the rod was washed three times with ethyl alcohol and then dried. These samples were weighed and then placed into a platinum-wire basket.

In the acid durability test, the basket and the rod samples were placed into an extractor. The glass rods were exposed alternately to the renewed vapor and liquid phase of 20 wt % HCl at $80\pm1°$ C. In the alkaline durability test, a plastic bottle in which the basket and the glass rods were soaked in 1N NaOH solution was settled in a silicone-oil bath at $80\pm1°$ C. In this test, the ratio of the NaOH solution volume to the sample surface area was kept constant at about 200 mL/cm$^2$ and the NaOH solution was renewed at 1-day intervals. The acid and alkaline durabilities were determined by observing the weight loss of the glass rod.

The density was measured using a powder of glass rod samples by the standard Archimedes method. The microhardness was measured with a Vickers hardness tester. In this case, a load of 50 g was applied for 15 s to the glass samples at room temperature and in the air.

In all tested properties, the new glass materials surpass the conventional commercial coating glass $Li_2O$-$Na_2O$-$K_2O$-$CaO$-$BaO$-$B_2O_3$-$ZrO_2$-$SiO_2$. The new glass materials have higher chemical durability, for example, acid durability and alkaline durability, than that of the conventional glass. Microhardness and density of the new glass materials were also higher than those of the conventional glass. New glass materials for coating metal having excellent functions compared with the conventional commercial glass were found.

In the computer-aided glass design apparatus of the present invention, as described above, the composition of components composing glass and the physical properties thereof are simulated in an interactive manner to derive an optimum composition and physical properties of glass, thus permitting support of glass design for the achievement of a desired glass material.

The present invention thus allows considerable saving of time and labor which have largely been consumed in the conventional practices of designing of glass materials and permits calculation of values of physical properties on the basis of numerical information of glass raw materials, such as the atomic radius and dissociation energy, thus making it possible to easily accomplish at a very high efficiency design of a glass material of a desired composition and/or having desired physical properties through comparison of compositions and physical properties.

Furthermore, the present invention achieves the simulation of the design of glass materials which has not been previously realized.

What is claimed is:

1. A glass composition design apparatus comprising:
   a memory device having stored therein glass component compound data and glass physical property data;
   a display device;
   an input device;
   wherein said display device includes means for displaying a plurality of glass component compounds from among the glass component compound data stored in said memory device, and wherein said input device includes means for selecting composition ratios from among the plurality of glass component compounds displayed on said display device to obtain a desired glass composition;
   processor means, including means for accessing said memory device, for approximating at least one physical property of the desired glass composition, and for causing said display device to display the thus approximated at least one physical property of the desired glass composition;
   a comparator for comparing the value of the approximated at least one physical property of the desired glass composition with a predetermined value range, and for causing said display device to display an indication of the thus compared values.

2. A glass composition design apparatus comprising:
   a memory device having stored therein glass component compound data and glass physical property data;
   a display device;
   an input device;
   wherein said display device includes means for displaying a plurality of glass component compounds from among the glass component compound data store in said memory device, and wherein said input device includes means for selecting composition ratios from among the plurality of glass component compounds displayed on said display device to obtain a desired glass composition;
   processor means, including means for accessing said memory device, for approximating at least one physical property of the desired glass composition, and for causing said display device to display the thus approximated at least one physical property of the desired glass composition;
   wherein said at least one physical property includes a primary physical property and a plurality of secondary physical properties, and wherein said processing means includes means for initially approximating said primary physical property and causing said display to initially display said primary physical property, and wherein said input device further includes means for causing said processing means to approximate said secondary physical properties and for causing said display device to display said secondary physical properties approximated by said processing means.

3. An apparatus as recited in claim 2, wherein said primary physical property is Young's modulus.

4. An apparatus as recited in claim 2, wherein said at least one physical property includes a primary physical property and a plurality of secondary physical properties, and wherein said processing means includes means for initially approximating said primary physical property and causing said display to initially display said primary physical property, and wherein said input device further includes means for causing said processing means to approximate said secondary physical properties and for causing said display device to display said secondary physical properties approximated by said processing means.

5. An apparatus as recited in claim 4, wherein said primary physical property is Young's modulus.

6. A glass composition design apparatus comprising:
   a memory device having stored therein glass component compound data and glass physical property data;
   a display device;
   an input device;
   wherein said display device includes means for displaying glass physical properties from among the glass physical property data stored in said memory device, and wherein said input device includes means for selecting and assigning values to a plurality of glass physical properties from among the glass physical properties displayed on said display device to obtain desired glass physical property values;

processor means, including means for accessing said memory device, for determining a glass composition, from among the glass component compound data, having approximate glass physical property values which are in accordance with the desired glass physical property values, and for causing said display device to display the thus determined glass composition a comparator for comparing the approximate glass physical property values of the glass composition determined by said processor means With desired glass physical property values, and for causing the display device to display an indication of the thus compared values.

7. An apparatus as recited in claim 6, wherein said input means further includes a means for setting a molecular ratio of at least one of the glass component compounds which make up the determined glass composition to obtain a new glass composition, and wherein said processing means includes means for approximating values of said plurality of glass physical properties of the new glass composition.

8. A method of designing a glass composition, comprising:
- a first step of storing in a memory device glass component compound data and glass physical property data;
- a second step of displaying on a display device a plurality of glass component compounds from among the glass component compound data;
- a third step of using an input device to select a glass composition from the glass component compounds displayed on the display device;
- a fourth step of processing the glass physical property data to obtain an approximated physical property of the glass composition;
- a fifth step of displaying on the display device the approximated physical property of the glass composition;
- a sixth step of comparing a value of the approximated physical property with a predetermined value range;
- a seventh step of using the input device to select a new glass composition and returning to said fourth step with respect to the new glass composition, when the value of the approximated physical property is outside the predetermined property range.

9. A method as recited in claim 8, further comprising an eighth step of displaying additional approximated physical properties of the glass composition when the value of the approximated physical property is within the predetermined range.

10. A method as recited in claim 9, further comprising a step of synthesizing raw materials of the glass component compounds of the glass composition to form a new glass material.

11. A method as recited in claim 8, further comprising a step of synthesizing raw materials of the glass component compounds of the glass composition to form a new glass material.

12. A method of designing a glass composition, comprising:
- a first step of storing in a memory glass component compound data and glass physical property data;
- a second step of displaying On a display device glass physical properties from among the glass physical property data;
- a third step of using an input device to select and assign values to a plurality of the glass physical properties displayed on the display device;
- a fourth step of processing the glass component compound data to obtain a glass composition having approximated physical properties which are in accordance with the plurality of glass physical properties displayed on the display device;
- a fifth step of displaying on the display device the glass composition obtained in said fourth step;
- a sixth step of comparing a value of one of the approximated physical properties with a predetermined value range;
- a seventh step of using the input device to select a new glass composition and processing the glass physical property data to approximate glass physical properties of the new glass composition, when the value of the approximated physical properties is outside the predetermined value range.

13. A method as recited in claim 12, further comprising a step of synthesizing raw materials of the glass component compounds of the glass composition to form a new glass material.

* * * * *